2,734,086
Patented Feb. 7, 1956

2,734,086

PRODUCTION OF AROMATIC HYDROPEROXIDES

Johan Michael Goppel and Simon Hendrik Zonneveld, Amsterdam, Netherlands, assignors to Shell Development Company, Emeryville, Calif., a corporation of Delaware No Drawing. Application April 10, 1952,
Serial No. 281,682

Claims priority, application Netherlands July 3, 1951

7 Claims. (Cl. 260—610)

This invention relates to improvements in the production of aralkylhydroperoxides. The invention relates more particularly to the production of aralkylhydroperoxides by the oxidation of aromatic compounds containing an alkyl group which is directly attached to the aromatic nucleus by means of a tertiary carbon atom.

Hydroperoxides, to the production of which the present invention relates, are obtained by the oxidation of aromatic compounds according to the empirical equation:

$$\text{Ar}-\underset{R^2}{\overset{R^1}{\underset{|}{\overset{|}{C}}}}-H + O_2 \longrightarrow \text{Ar}-\underset{R^2}{\overset{R^1}{\underset{|}{\overset{|}{C}}}}-O-O-H$$

in which Ar represents an aromatic hydrocarbon radical selected from the group consisting of aryl and alkaryl groups and $R^1$ and $R^2$ each represent the same or a different member of the group consisting of any monovalent organic radical, aliphatic, cycloaliphatic, aromatic heterocyclic including hydrocarbon radicals such as alkyl, cycloalkyl, aryl, aralkyl, alkaryl, saturated and unsaturated groups. The radical Ar may be mono- or poly-nuclear and may be further substituted by minor substituents such as methoxy, ethoxy, radicals. The aromatic hydrocarbons oxidized to obtain the organo hydroperoxides to which the invention relates comprise the alkyl benzene hydrocarbons in which the substituents are one or more alkyl groups, one of which has a tertiary carbon atom attached to the benzene ring. Such alkyl benzene hydrocarbons include, for example, isopropyl benzene (viz. α-methyl-ethyl benzene) p-methyl-isopropyl benzene p-diisopropyl benzene, isopropyl naphthalene, their homologues and analogues.

Molecular oxygen, i. e. pure oxygen gas or a mixture of gases comprising oxygen, e. g. air, is generally used as the oxidizing agent, while the aromatic compound to be oxidized is in the liquid state.

The hydroperoxides as just defined may for instance be used as polymerization accelerators, as catalysts in reacting macromolecular compounds, such as rubber with sulfur dioxide as disclosed and claimed in co-pending application Serial No. 133,022 filed August 29, 1949, which matured into U. S. Patent No. 2,558,527, issued June 26, 1951 and as intermediates in the manufacture of various products, for instance the corresponding alcohols, but particularly of phenolic compounds as disclosed and claimed in co-pending application Serial No. 287,493, filed May 13, 1952.

In the specific case wherein the above formula $R^1$ and $R^2$ are both methyl groups and Ar is a phenyl group, the original aromatic compound is cumene, from which cumene hydroperoxide is formed by the oxidation according to the equation

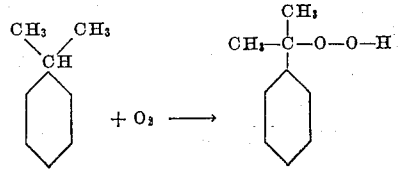

Cumene may be easily prepared by alkylating benzene. This was performed on a large scale during World War II, as cumene was used in motor spirit for aircraft.

Methods for preparing hydroperoxides by oxidation of the above defined aromatic compounds have been disclosed heretofore.

It is generally assumed that the reaction is a chain process involving free radicals. This explains why the rate of the reaction is always low during an "induction period," unless chain-starting "initiators" are added. The reaction rate substantially increases after that period. The presence of free radicals binding impurities may, however, considerably extend the induction period and even make the aromatic compound practically unoxidizable. Byproducts formed during the oxidation may also have an inhibiting effect in that they interrupt the reaction chains.

Various materials have been added to promote the formation of hydroperoxides, either as catalysts or as so-called initiators, which shorten the induction period. Certain compounds of heavy metals have been reported to catalyze the oxidation reaction. More recently, however, it has been reported that the presence of these materials promotes decomposition reactions.

The presence of water has been stated to favor oxidation (H. N. Stephens, J. Am. Chem. Soc. 48 (1926), 2920-2). It has been proposed to disperse or emulsify the aromatic compound in an aqueous continuous phase during oxidation. More recently it was reported that water counteracts the formation of decomposition products, which have an inhibiting effect, but that it has an adverse effect on the rate of the oxidation and promotes decomposition reactions other than those in which inhibitors are formed.

Irradiation by means of a mercury vapor lamp has been used to promote the reaction. (Heinrich Hock and Shon Lang, Ber. deutsch. Chem. Ges. 77 (1944), 257-64).

According to British patent specification No. 630,286, page 8, lines 13-15, the presence of ozone in the gases containing oxygen has proved to be advantageous. Processes have been described in which aqueous alkaline solutions are in intimate contact with the aromatic compound to be oxidized.

As initiators peroxidic compounds have mainly been employed heretofore. Preferred are the hydroperoxides to be manufactured, since then no additional ingredients will be present in the final reaction mixture. Small proportions of the hydroperoxide may be introduced before oxidation is commenced. Fresh amounts of the aromatic compound to be oxidized may be added during the course of the oxidation to utilize the favorable influence of the hydroperoxide already formed and to reduce the hydroperoxide concentration in the reaction zone thereby decreasing hydroperoxide decomposition.

In accordance with the present invention aralkyl hydroperoxides, such as, for example, alpha,alpha-dialkyl aralkyl hydroperoxides, are produced with substantially improved efficiency by effecting the oxidation of the corresponding aralkyl hydrocarbon in the presence of an added organic nitrogen compound selected from the group consisting of secondary and tertiary amines. It has been found that the presence of certain nitrogen compounds enables the oxidation reaction to proceed with substantial diminution of initial induction period and of organo hydroperoxide decomposition often encountered in the absence of such compounds.

Nitrogen compounds employed in accordance with the invention comprise the cyclic tertiary amines containing a nuclear tertiary nitrogen atom such as quinoline, pyridine and their alkyl substitution products. Particularly preferred are the pyridine bases exemplified by pyridine and the alkyl substituted pyridines such as, methyl pyridine, dimethyl pyridine, ethyl pyridine, ethyl methyl pyridine, butyl pyridine, their homologues, etc.

Catalysts may be employed. However these are often found to have no appreciable effect when carrying out the oxidation in accordance with the invention. Since in most instances it is necessary to separate the catalyst from the solution obtained after the reaction, which generally incurs complex operative procedures, it is usually preferred not to use catalysts.

The use of initiators in addition to the above-defined nitrogen compounds may be resorted to within the scope of the present invention. The use of the same hydroperoxides being produced in the process as such additional initiators is at times desirable. The final reaction mixture will then comprise no additional components. A minor proportion of previously oxidized aromatic compound may, for example, be added to a fresh aromatic hydrocarbon charge being introduced into the reaction zone.

Impurities are often present in substantial amount in commercial grades of the aromatic compounds or if they have been recovered from solutions in which they were present as solvents. In the latter case the degree of contamination depends very much on the purpose for which such solutions were used and on the conditions to which they were subjected in such use. The charge to the process may be subjected to suitable pretreatment directed to the purification thereof. It should be observed, however, that purification per se will generally not avoid the occurrence of the induction period.

Methods of purifying the charge complete for example: refluxing for 8 hours in the presence of metallic sodium with subsequent fractionation; washing with aqueous sodium bisulphite or potassium permanganate solution; distillation with subsequent hydrogenation; treating with sodium hydroxide. Applicants have found that through purification, the choice of the method depending on circumstances, may at times effect a substantial reduction of induction period. It is, however, greatly desirable in commercial scale operation to reduce relatively costly purification operations to a minimum and to overcome inhibition by the addition of an initiator.

The favorable effect of the added nitrogen compounds is made apparent by a marked decrease in the formation of color-forming impurities. This is of great importance particularly when the hydroperoxides are to be employed as polymerization accelerators or in a process such as that of the above-referred to co-pending application Serial No. 113,022 since the products of said process would be discolored by the impurities rendering them of little practical value.

Atmospheric air is generally preferred as the oxidizing gas because it is cheaper than pure or even commercial oxygen, though it may in some instances be advantageous to use oxygen, because it increases the reaction rate. Discoloration is, however, encountered more frequently when oxygen is used instead of air. The oxygen, air or other oxygen-containing gas may be humidified or dried, if desired, so as to obtain an advantageous moisture content. When air is used, it may be freed from carbon dioxide. In many instances, atmospheric air may, however, be used as such.

In general, the rate of hydroperoxide formation increases with increase in temperature. Below 50° C. the reaction rate is often too low for practical scale operation. On the other hand, if the temperature is too high, the hydroperoxide yields generally become poor as a result of increased decomposition. It is, therefore, usually preferred to employ temperatures not exceeding about 120° C. A preferred temperature range comprises from about 90° to about 110° C. Somewhat higher temperatures may be employed when a pressure above atmospheric is employed. In general, however, hydroperoxide yields were not found to increase substantially with increase in pressure above atmospheric. Higher pressures necessitate the use of more complex and costly equipment.

The oxidation reaction is preferably carried out under substantially anhydrous conditions or in the presence of such relatively small amounts of water that no substantial formation of a second liquid phase takes place.

It is very desirable that during the reaction the oxygen-containing gas is brought into intimate contact with the liquid to be oxidized. To this effect means such as, for example, stirrers, nozzles with fine pores, and porous plates may be employed.

It has been proposed to effect good contact between the liquid reactant and the oxidizing gas by forcing the latter through the reaction vessel in such a manner that said vessel is continuously and substantially completely filled with a dispersion of the gas in the liquid. The pressure of the gas at the point of entry is at least one atmosphere gauge. The dispersion of gas and liquid may be discharged into a separator in which gas and liquid phases are separated at substantially atmospheric pressure.

The hydroperoxide content of the reaction mixtures may be determined at regular intervals by analyzing samples e. g. by means of an iodometric titration. It is, in general, preferred to interrupt the oxidation when a certain, not very elevated, content has been reached. Though it is possible to go as far as, for instance, 80% by weight, this not advisable as decomposition of the hydroperoxide formed increases and the rate of hydroperoxide formation decreases as the hydroperoxide content increases. Conversions of, for example, from approximately 40 to 50 per cent by weight may be attained in practice, as hydroperoxide yields are then satisfactory. Best yields are, however, obtained when the conversion is not carried further than to approximately 20% by weight.

The hydroperoxides may be separated from unreacted aromatic hydrocarbon compounds by distillation, preferably at reduced pressures. The hydroperoxides themselves may then be purified by separate distillation optionally at lower pressures. A preferred method of recovering the hydroperoxides from the solutions consists, however, in shaking the solutions with an aqueous 20% excess caustic soda solution calculated on the hydroperoxide. The aqueous phase is separated from the organic liquid and cooled to 0° C. at which temperature the sodium salt of the hydroperoxide crystallizes. It is separated by filtration, preferably through a glass filter, washed with an organic liquid, such as acetone, and dissolved in water again, the solution being filtered. Carbon dioxide is passed through the filtrate, which is then extracted with petroleum ether, the extract being dried on solid potassium carbonate. The petroleum ether solution is distilled at approximately 50° C. beginning at atmospheric pressure and gradually lowering the pressure to 1 mm. Hg. The residue in the distilling flask is substantially pure hydroperoxide, e. g. cumene hydroperoxide.

The proportion of the tertiary amine, for example, a pyridine base, such as pyridine, to be added to obtain optimum results will vary to some extent in accordance with the amount and the nature of impurities present in the aromatic compound, for example, cumene, to be oxidized. In general, proportions ranging from 0.01 to 1 per cent by weight were found to be most advantageous. The use of lower or higher proportions is, however, comprised within the scope of the invention. Approximately 1 per cent by weight of pyridine has been found satisfactory when oxidizing cumene which has been recovered from a process such as that of copending application No. 113,022 referred to above. When purifying commercial grade cumene proportions of pyridine as low as about 0.01 per cent by weight are often sufficient.

In the oxidation of an aromatic compound such as, for example, isopropylbenzene, addition of the nitrogen compound, such as pyridine, may be made by admixing the pyridine with the oxidizing gas prior to its introduction into the reaction zone. Amounts ranging from about 50 to about 300 mg., preferably about 100 to about 150 mg., per liter of oxygen contained in the gas have been found effective with a cumene charge of relatively high purity. Smaller or greater proportions may, however, be employed within the scope of the invention. Good results were obtained with the addition of about 25 mg. of pyridine per liter of air when oxidizing commercial grade cumene, at a temperature of about 110° C. When this method is used for introducing the nitrogen compound into the system its concentration in the reaction mixture will gradually increase with increase of the hydroperoxide concentration, which is often a desirable feature enabling attainment of optimum effect.

Although in the foregoing detailed description of the invention the production of cumene hydroperoxide (alpha,alpha-dimethylbenzylhydroperoxide), by the oxidation of the corresponding aromatic hydrocarbon isopropyl benzene, is stressed, it is to be understood that the invention is in no wise limited in its application to the production of this specific compound but may be applied broadly to the production of organo hydroperoxides, particularly those in which the hydroperoxide group (—O—O—H) is linked to a tertiary aliphatic carbon atom which is directly attached to a nuclear carbon atom in a benzene ring. Examples of the broad class of organo hydroperoxides to the production of which by oxidation of the corresponding aromatic hydrocarbon the invention is applied include:

$\alpha$-Ethyl-$\alpha$-methylbenzyl hydroperoxide
$\alpha,\alpha$-Dimethyl-p-methylbenzyl hydroperoxide
$\alpha,\alpha$-Dimethyl-p-isopropylbenzyl hydroperoxide
Diphenylmethyl hydroperoxide
$\alpha,\alpha$-Dimethylnaphthylmethyl hydroperoxide
$\alpha,\alpha,\alpha',\alpha'$-Tetramethyl-p-xylylene dihydroperoxide
p-Xylyl hydroperoxide
$\alpha$-Phenylethyl hydroperoxide The following examples are illustrative of the production of organo-hydroperoxides in accordance with the invention.

*Example I*

700 cc. of commercial grade cumene were introduced into a vertical glass tube having a length of 150 cm. and a diameter of 4.5 cm. The bottom of this tube consisted of a glass filter through which the oxidizing gas could be introduced by means of a valved line with flow meter. The glass tube was open to the air at the top. The lower part of the tube, normally filled with liquid during the process, could be heated by means of electrical resistance wire wound around the tube through which a variable electric current could be led to regulate the temperature of the liquid.

The oxidation was carried out by bubbling air, washed with 4N-NaOH, at a rate of 50 l. per hour per kg. of cumene through the liquid in the tube. Temperature was maintained at 110° C. The amount of absorbed oxygen was computed from the oxygen content of the oxidized product. The yield of hydroperoxide was calculated with respect to absorbed oxygen.

The total oxygen content of the reaction mixture was determined by means of the method of Schutze, described in Zeitschr. fur Anal. Chem. 118 (1939), 241.

The hydroperoxide contents were determined as follows:

40 ml. of pure isopropyl alcohol and 2 cc. of acetic acid were added together in a 250 cc. Erlenmeyer flask. The sample to be analysed was then introduced. These samples weighed approximately 150 mg. each time and were contained in small sample tubes. The flask was attached to a reflux condenser and the total mixture was then heated to reflux temperature, and through the condenser 10 cc. of a saturated solution of sodium iodide in isopropyl alcohol were added. Refluxing was continued during 5 minutes. After cooling the Erlenmeyer flask was separated from the condenser, 5 ml. of water were added and the mixture was titrated with 0.1 N $Na_2S_2O_3$ until it was colorless. No starch was used.

Discoloration of the oxidized cumene samples was measured with the aid of a Dubosq colorimeter, using solutions of a yellow dyestuff, known under the trade name Cellit Echtgelb R in 50:50 mixtures of ethanol and water as standards. A color index of 100 corresponds to a concentration of 175 mg. of the dyestuff per liter. The color is then deep orange. Colors and concentrations of the dyestuff with other values of the index are given in the following table.

| Color index | Concentration of dyestuff in mg./liter | Color |
| --- | --- | --- |
| 0 | 0 | colorless. |
| 1 | 1.75 | light yellow. |
| 10 | 17.5 | yellow. |
| 25 | 43.75 | dark yellow. |
| 50 | 87.5 | orange. |

The results obtained are shown in the following table.

| Reaction time (hours) | Hydroperoxide content (grams per kg. of cumene initially present) | Oxygen content in hydroperoxide (percent wt. on cumene initially present) | Total oxygen content (percent wt. on cumene initially present) | Yield of peroxide, percent | Color index |
| --- | --- | --- | --- | --- | --- |
| 1 | 2.5 | 0.05 | 0.12 | | |
| 2 | 5.6 | | | | |
| 3 | 18 | 0.37 | 0.39 | 95 | |
| 9 | 118 | 2.5 | 2.7 | 93 | 2 |
| 16 | 212 | 4.3 | 5.4 | 80 | 11 |
| 19 | 234 | 4.9 | 6.3 | 78 | |
| 20 | 227 | 4.8 | 6.75 | 71 | |
| 21.2 | 231 | 4.85 | 6.8 | 71 | 33 |
| 22.2 | 226 | 4.8 | 7.0 | 69 | 38 |
| 26 | 140 | 2.95 | 7.5 | 39 | >100 |

The experiment was repeated with 600 cc. of cumene, introducing air containing 25 mg. of pyridine per liter at a rate of 30 l. per hour per kg. of cumene, other conditions being the same.

| Reaction time (hours) | Hydroperoxide content (grams per kg. of cumene initially present) | Oxygen content in hydroperoxide (percent wt. on cumene initially present) | Total oxygen content (percent wt. on cumene initially present) | Yield of peroxide, percent | Color index |
| --- | --- | --- | --- | --- | --- |
| 1 | 12 | | | | |
| 6.5 | 240 | 5.05 | | | |
| 14.5 | 460 | 9.7 | 11.5 | 83 | 1.5 |
| 17 | 464 | 9.8 | 13.0 | 75 | 3 |
| 19 | 438 | | | | 4 |
| 20 | 421 | 8.85 | 12.8 | 69 | 5 |

*Example II*

In the same apparatus as in Example I, four samples of 700 cc. of cumene recovered from the sulphur dioxide spinning process described in co-pending application No. 113,022, were each separately treated for 16.5 hours at 110° C. with air which had been washed with 4 N-NaOH, at a rate of 50 l. per hour per kg. of cumene. Conditions which were varied in specific operations, as well as results obtained, are indicated in the following table:

| Cumene Charge | Pyridine content in air (mg./l) | Hydroperoxide content after oxidation (grams per kg. of cumene initially present) |
| --- | --- | --- |
| untreated | 0 | 0 |
| purified | 0 | 7.8 |
| Do | 25 | 62.2 |
| purified and 1 percent by weight of pyridine admixed. | 0 | 408.3 |

That the desired effect of the added tertiary amine is not obtained by the use of a primary amine in its stead is evidenced by the following example:

Example III

In an operation, run 1, 200 cc. of isopropylbenzene, containing 3% alpha,alpha-dimethylbenzyl hydroperoxide as initiator, was placed in a Pyrex reactor. Oxygen was passed through the mixture at a temperature of 120° C. and a rate of 9 liters of oxygen per hour.

In a separate operation, run 2, the experiment of run 1 was repeated under substantially identical conditions with the exception that ¼ mol per cent of aniline was added to the charge.

Results obtained in each of runs 1 and 2 in terms of periodic determination (by iodometric titration) of the hydroperoxide content of the reaction mixture are set forth in the following table:

| Time in hours | $\alpha,\alpha$-dimethylbenzyl hydroperoxide concentration in the reaction mixture, percent by wt. | |
|---|---|---|
| | Run No. 1 | Run No. 2 |
| 0 | 3.0 | 3.0 |
| 1 | 9.0 | 6.9 |
| 2 | 16.0 | 11.7 |
| 3 | 27.4 | 12.0 |

The invention claimed is:

1. In a process for the production of an alpha,alpha-dialkyl arylmethyl hydroperoxide-containing reaction mixture by the interaction of an alpha,alpha-dialkyl arylmethane with an oxygen-containing gas, the improvement which comprises effecting said reaction in the presence of added pyridine.

2. In a process for the production of an alpha,alpha-dialkyl benzyl hydroperoxide-containing reaction mixture by the recation of an alpha,alpha-dialkylmethylbenzene with an oxygen-containing gas, the improvement which comprises effecting said reaction in the presence of added pyridine.

3. The process in accordance with claim 2 wherein said pyridine is present in an amount of from about 0.01 to about 1% by weight of the reaction mixture.

4. In a process for the production of an alpha,alpha-dimethylbenzyl hydroperoxide-containing reaction mixture by the reaction of isopropylbenzene with an oxygen-containing gas, the improvement which comprises effecting said reaction in the presence of an added pyridine.

5. The process in accordance with claim 4 wherein said pyridine is present in an amount of from about 0.01 to about 1% by weight of the reaction mixture.

6. In a process for the production of an alpha,alpha-dialkyl benzyl hydroperoxide-containing reaction mixture wherein an oxygen-containing gas is passed through liquid alpha,alpha-dialkylmethylbenzene under hydrocarbon oxidizing conditions, the improvement which comprises adding pyridine to said oxygen-containing gas prior to its passage through said liquid alpha,alpha-dialkyl-substituted alkylbenzene.

7. In a process for the production of alpha,alpha-dimethylbenzyl hydroperoxide wherein an oxygen-containing gas is passed through liquid isopropylbenzene under hydrocarbon oxidizing conditions, the improvement which comprises adding pyridine to said oxygen-containing gas prior to its passage through said liquid isopropylbenzene.

References Cited in the file of this patent

UNITED STATES PATENTS

| 2,508,256 | Harman | May 16, 1950 |
| 2,548,435 | Lorand | Apr. 10, 1951 |
| 2,618,662 | Hutchinson | Nov. 18, 1952 |
| 2,619,509 | Joris | Nov. 25, 1952 |
| 2,632,026 | Conner, Jr. | Mar. 17, 1953 |

OTHER REFERENCES

Frank: "Chemical Reviews," vol. 46 (1950), pgs. 155–169.